(12) United States Patent
Boudjenah et al.

(10) Patent No.: US 10,723,323 B2
(45) Date of Patent: Jul. 28, 2020

(54) WINDSCREEN WIPER DEVICE

(71) Applicant: FEDERAL-MOGUL S.A., Aubange (BE)

(72) Inventors: Daniel Boudjenah, Margut (FR); Xavier Boland, Arlon (BE)

(73) Assignee: Trico Belgium SA, Aubange (BE)

( * ) Notice: Subject to any disclaimer, the term of this patent is extended or adjusted under 35 U.S.C. 154(b) by 0 days.

(21) Appl. No.: 15/779,284

(22) PCT Filed: Dec. 9, 2015

(86) PCT No.: PCT/EP2015/079122
§ 371 (c)(1),
(2) Date: May 25, 2018

(87) PCT Pub. No.: WO2017/097353
PCT Pub. Date: Jun. 15, 2017

(65) Prior Publication Data
US 2018/0319373 A1    Nov. 8, 2018

(51) Int. Cl.
*B60S 1/38* (2006.01)
(52) U.S. Cl.
CPC .......... *B60S 1/3858* (2013.01); *B60S 1/3851* (2013.01); *B60S 1/3877* (2013.01); *B60S 1/3879* (2013.01)
(58) Field of Classification Search
CPC .... B60S 1/3851; B60S 1/3855; B60S 1/3858; B60S 1/3856; B60S 1/40; B60S 1/3849;
(Continued)

(56) References Cited

U.S. PATENT DOCUMENTS 9,580,047 B2 *   2/2017   Boudjenah ............ B60S 1/3858
9,623,844 B2 *   4/2017   Boland ................. B60S 1/3858
2014/0289990 A1  10/2014  Boulanger

FOREIGN PATENT DOCUMENTS

DE     102 53 580 A1    5/2004
WO     WO2012/139635 A1 10/2012

OTHER PUBLICATIONS

William Andrew 1, Handbook of Plastics Joining (Second Edition), 2009, Applied Science Publishers, Chapter 18, section 18.6 (Year: 2009).*

(Continued)

*Primary Examiner* — Orlando E Aviles
*Assistant Examiner* — Robert F Neibaur
(74) *Attorney, Agent, or Firm* — Miller Canfield (57) ABSTRACT

A windscreen wiper device (1) of the flat blade type, particularly for automobiles, includes an elastic, elongated carrier element, as well as an elongated wiper blade (2) of a flexible material, which can be placed in abutment with a windscreen to be wiped. The wiper blade includes at least one longitudinal groove (3), in which groove at least one longitudinal strip (4) of the carrier element is disposed. A connecting device (5) is connected to the flexible material of the wiper blade by at least one pin (14), that cooperates with a recess (21) provided along an exterior edge of the longitudinal strip in order to limit any movement of the wiper blade in longitudinal direction thereof relative to the longitudinal strip at the location of the interconnection of the connecting device and the wiper blade. The connecting device has a substantially U-shaped cross-section, wherein free ends of legs (8) of the U-shaped cross-section extend inwardly so as to form grooves for receiving longitudinal sides of the wiper blade. At least one of the legs is provided with a hole (13) for receiving the pin, with the special feature (Continued)

that the pin is glued to an inner wall (25) of the hole or the pin is form-locked inside the hole.

10 Claims, 11 Drawing Sheets

(58) Field of Classification Search
CPC .... B60S 1/3877; B60S 1/3874; B60S 1/3875; B60S 1/3898
USPC .......... 15/250.32, 250.361, 250.31, 250.452
See application file for complete search history.

(56) References Cited

OTHER PUBLICATIONS

William Andrew 2, Handbook of Plastics Joining (Second Edition), 2009, Applied Science Publishers, Chapter 18, section 18.4 (Year: 2009) (Included in William Andrew 1 Reference Document.*

* cited by examiner

WINDSCREEN WIPER DEVICE

BACKGROUND

1. Technical Field

The present invention relates to a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to the connecting device about a pivot axis near one end thereof, wherein the connecting device is connected to the flexible material of the wiper blade by at least one pin, wherein the pin cooperates with a recess provided along an exterior edge of the longitudinal strip in order to limit any movement of the wiper blade in longitudinal direction thereof relative to the longitudinal strip at the location of the interconnection of the connecting device and the wiper blade, wherein the connecting device has a substantially U-shaped cross-section, wherein free ends of legs of the U-shaped cross-section extend inwardly so as to form grooves for receiving longitudinal sides of the wiper blade, and wherein at least one of the legs is provided with a hole for receiving the pin. Particularly, the oscillating arm can be pivotally connected to the connecting device with the interposition of a joint part. More in particular, the wiper blade comprises a spoiler at a side thereof facing away from the windscreen to be wiped, wherein the wiper blade and the spoiler are preferably made in one piece through extrusion, the longitudinal groove is preferably a central longitudinal groove accommodating the longitudinal strip, the longitudinal strip is also called a "flexor", while the connecting device is also indicated as a "connector". In the framework of the present invention the connector is preferably made in one piece, also called a "one piece connector".

2. Related Art

Such a windscreen wiper device is known from international patent publication no. WO 2012/139635 of the same Applicant which is hereby incorporated by reference. This prior art windscreen wiper device is designed as a so-called "flat blade" or "yokeless blade", wherein no use is made of several yokes pivotally connected to each other, but wherein the wiper blade is biassed by the carrier element, as a result of which it exhibits a specific curvature. The spoiler is also called an "air deflector". In the international patent publication advantageously at least two of such pins are provided on opposite sides of the longitudinal strip, wherein the pins are preferably located opposite one another. In the international patent publication the connecting device is particularly connected to the flexible material of the wiper blade by the at least one pin being of a first type and at least one pin of a second type, wherein the pin of the second type is cutting the wiper blade at the location of the interconnection of the connecting device and the wipe blade in order to block any lateral movement of longitudinal strip at the location of the interconnection of the connecting device and the wiper blade. In other words, the pin of the first type ensures that the wiper blade and the longitudinal strip are not allowed to mutually move under the connecting device, but particularly in all other areas along the wiper blade a slight movement thereof is made possible in order to allow the wiper blade to follow any curvature of the windscreen to be wiped. It is this interaction between the pin of the first type and the wiper blade that elastomerie material (i.e. usually rubber) of the wiper blade and material of the longitudinal strip (i.e. usually steel) are forced to engage with each other in a locking manner when the connecting device is finally mounted onto the wiper blade, all at the location under the connecting device. the pin of the first type is mounted inside the recess by stamping the pin of the first type through the flexible material of the wiper blade and inside the recess. the pin of the second type ensures that the so-called "fishtailing phenomenon" is avoided at all times. the wiper blade at the location outside the connecting device would normally suffer from this "fishtailing phenomenon", wherein the wiper blade on opposite sides of the connecting device vibrates in an uncontrollable manner parallel to the windscreen to be wiped. Obviously, the "fishtailing phenomenon" results in deteriorated wiping properties, with all negative consequences involved, particularly at high speeds. the cut by the pin of the second type is realized at the time of mounting the connecting device onto the wiper blade during assembly of all relevant parts of the wiper blade, wherein the cut is particularly effected in a side region of the wiper blade, without having any influence on a bottom region thereof (i.e. containing a wiping lip of the wiper blade). Consequently, wiping properties of the wiper blade are not adversely affected.

SUMMARY

The object of the invention is to provide an improved windscreen wiper device. More in particular, the present invention aims to reduce stress forces at the location of the hole of the connecting device, as a result of introducing the pin inside the hole by three, in order to prevent fractures in the connecting device due to these stress forces. The fractures may negatively influence the retention of the connecting device (and therefore of the wiper blade relative to the oscillating arm) onto the wiper blade, as the pin may get loose due to the fractures. Hence, the present invention has the object to reduce these stress forces and to improve retention of the pin inside the hole, also after any heat treatment of the wiper blade.

In order to accomplish that objective, a windscreen wiper device of the type referred to in the introduction is characterized according to the invention in that the pin is glued to an inner wall of the hole or the pin is form-locked (German: "Formschluss") inside the hole. Hence, the pin is connected inside the hole of the connecting device in a stress-free manner, so that the pin is not force-locked to the connecting device. Stress forces are now considerably reduced either by gluing or by form-locking (or "positive locking" or "having a positive fit") the pin inside the hole of the connecting device.

the pin particularly is a separate element, i.e. a single constructional element extending in mounted position at least substantially perpendicular to the windscreen to be wiped.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade, the groove (s) may be closed at one outer end.

Further, it is noted that in the invention use is made of a mounting head fixed for rotation to a shaft, wherein the shaft is rotatable alternately in a clockwise and in a counter-clockwise sense carrying the mounting head into rotation. Thus, in turn the mounting head draws the connecting device into rotation and thereby moves the wiper blade. In the alternative, the mounting head is fixed for translation to a carriage, wherein the carriage can be translated alternately in a one linear direction and in another counter linear direction carrying the mounting head into translation. The present invention can therefore be used for circular or linear movement of the mounting head.

In a preferred embodiment of a windscreen wiper device in accordance with the present invention the pin and the inner wall of the hole are provided with mutually cooperating snapping means for form-locking the pin inside the hole. In other words, snapping the pin inside the hole of the connecting device in order to obtain a form-locked interconnection there between is realized either by a protrusion extending sidewardly and outwardly from the inner wall of the hole and snapping behind an edge of the pin or by a protrusion extending sidewardly and outwardly from the pin and snapping behind an edge of the inner wall of the hole.

In another preferred embodiment of a windscreen wiper device according to the present invention the pin comprises an elongate web and at least one shoulder near an outer end of the web in use facing away from a windscreen to be wiped, wherein the shoulder is snapped behind an edge of the inner wall of the hole for form-locking the pin inside the hole. Particularly, the shoulder forms a flange on the outer end of the web.

In another preferred embodiment of a windscreen wiper device in accordance with the present invention the web and the flange are made in one piece, preferably one piece of plastic material.

In another preferred embodiment of a windscreen wiper device according to the present invention the pin comprises two shoulders each located near an outer end of the web. In other words, the one shoulder is located at an outer end of the pin in use facing away from a windscreen to be wiped, whereas the other shoulder is located at an outer end of the pin in use facing toward a windscreen to be wiped. the shoulders preferably each form a flange being in one piece with the web of the pin.

In another preferred embodiment of a windscreen wiper device in accordance with the present invention the pin is deformed near its outer ends so as to form rivets for form-locking the pin inside the hole through a rivet connection. Hence, a rivet is formed at an outer end of the pin in use facing away from a windscreen to be wiped, as well as at an outer end of the pin in use facing toward a windscreen to be wiped. Particularly, a special tool is used to deform both outer ends.

In another preferred embodiment of a windscreen wiper device according to the present invention wherein the connecting device is connected to the flexible material of the wiper blade by the at least one pin being of a first type and at least one pin of a second type, wherein the pin of the second type is slightly cutting the wiper blade at the location of the interconnection of the connecting device and the wiper blade in order to block any lateral movement of longitudinal strip at the location of the interconnection of the connecting device and the wiper blade. Preferably, the pin of the first type allows movement of the wiper blade in longitudinal direction thereof relative to the longitudinal strip outside the location of the interconnection of the connecting device and the wiper blade. Hence, it is made possible to allow the wiper blade to follow any curvature of the windscreen to be wiped. Preferably, the pin of the second type is slightly cutting the wiper blade in the form of a C. Preferably, the pin of the second type exerts a transverse force on the longitudinal strip, in order to block any lateral movement of longitudinal strip at the location of the interconnection of the connecting device and the wiper blade. Preferably, no other force than the transverse force is exerted by the pin of the second type.

In a manner similar to the pin of the first type, the pin of the second type is also glued to the inner wall of a hole provided in at least one of the legs of the U-shaped cross-section of the connecting device or the pin of the second type is also form-locked inside the hole, i.e. either by snapping or by riveting in a manner as described above in relation to the pin of the first type.

the pin of the first type and the pin of the second type are preferably separate elements, i.e. single constructional elements extending in mounted position at least substantially perpendicular to the windscreen to be wiped.

In another preferred embodiment of a windscreen wiper device in accordance with the present invention the connecting device is connected to the flexible material of the wiper blade by one pin of the first type interconnecting the connecting device and the wiper blade near the middle longitudinal plane of the connecting device perpendicular to the windscreen to be wiped and by two pairs of opposite pins of the second type interconnecting the connecting device and the wiper blade near the outer ends of the connecting device. In the alternative, the connecting device is connected to the flexible material of the wiper blade by one pair of opposite pins of the first type interconnecting the connecting device and the wiper blade near the middle longitudinal plane of the connecting device perpendicular to the windscreen to be wiped and by two pairs of opposite pins of the second type interconnecting the connecting device and the wiper blade near the outer ends of the connecting device. In the alternative, the connecting device is connected to the flexible material of the wiper blade by one pair of opposite pins of the first type and by one pair of opposite pins of the second type interconnecting the connecting device and the wiper blade near the outer ends of the connecting device.

In the alternative, the connecting device is connected to the flexible material of the wiper blade by two pairs of opposite pins of the first type interconnecting the connecting device and the wiper blade near the outer ends of the connecting device.

The present invention also refers to a method for manufacturing a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to the connecting device about a pivot axis near one end thereof, wherein first a recess is cut along an exterior edge of the longitudinal strip, wherein the connecting device is subsequently mounted onto the wiper blade, wherein the longitudinal strip is subsequently inserted inside the groove, whereinafter at least one pin is used, the pin cooperating with the recess provided along the exterior edge of the longitudinal strip in order to block any movement of the wiper blade in longitudinal direction thereof relative to the longitudinal strip at the location of the interconnection of the connecting device and the wiper blade, characterized by gluing the pin to an inner wall of the hole or form-locking the pin inside the hole.

In the present invention the connecting device is preferably pivotally connected to the oscillating arm with the interposition of a joint part, wherein the joint part is detachably connected to the connecting device by engaging protrusions of the connecting device, at the location of the pivot axis, in recesses provided in the joint part. This is preferably, realized through a snapping or clipping operation. the joint part has preferably an at least substantially U-shaped cross-section at the location of its connection to the connecting device, wherein the joint part is provided with a recess provided coaxially with the pivot axis. In particular, the protrusions extend outwards on either side of the connecting device and are preferably cylindrical in shape. In the alternative, the protrusions are spherical or frusto-conical in shape. the protrusions that function as bearing surfaces are thus paced far apart, so that forces exerted thereon will be relatively low, in yet another preferred variant the joint part is provided with co-axial through holes in legs of the U-shaped cross-section thereof, wherein a pivot pin is inserted in the through holes. Preferably, the protrusions are provided with co-axial through holes. Accordingly, the wiper blade may then be connected to the oscillating arm on the basis of a so-called "sidelock system", The oscillating arm is provided with a joint pin or a pivot pin to be inserted in the co-axial through holes. the pivot pin protrudes in a direction towards the wiper blade and has a pivot axis extending in a direction of the oscillating movement of the oscillating arm. Preferably, the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

THE DRAWINGS

The invention will now be explained more in detail with reference to figures illustrated in a drawing, wherein.

DETAILED DESCRIPTION

Figure 1:
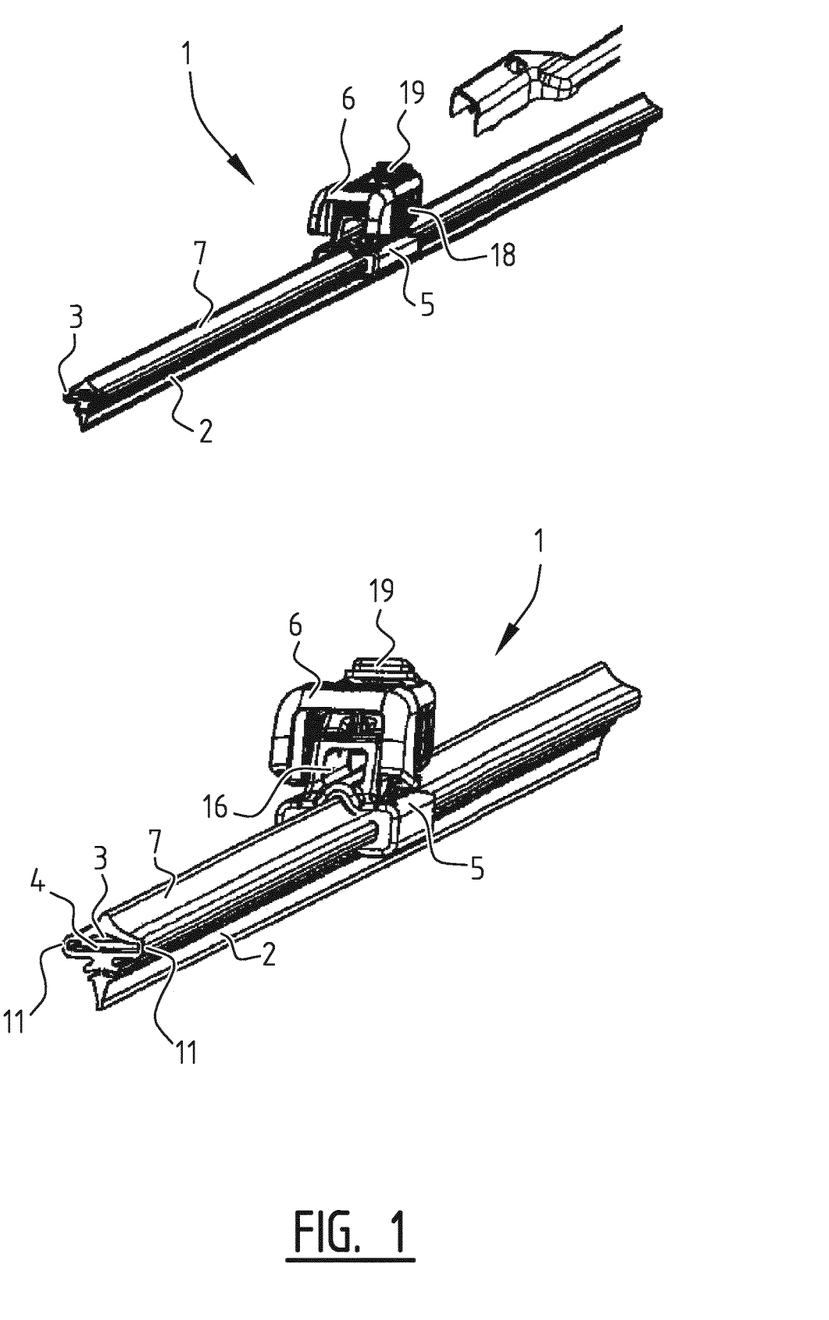
FIG. 1 is a perspective, schematic view of a preferred embodiment of a windscreen wiper device according to the invention, with a joint part.

FIG. 1 shows a preferred variant of a windscreen wiper device 1 according to the invention. the windscreen wiper device 1 is built up of an elastomeric wiper blade 2 comprising a central longitudinal groove 3, wherein a longitudinal strip 4 made of spring band steel is fitted in the longitudinal groove 3 (see FIGS. 5, 6 and 7). the strip 4 forms a flexible carrier element for the rubber wiper blade 2, as it were, which is thus biassed in a curved position (the curvature in operative position being that of a windscreen to be wiped. The windscreen wiper device 1 is furthermore built up of a connecting device 5 of metal or plastic for connecting an oscillating wiper arm thereto, with the interposition of a joint part 6. The oscillating wiper arm is pivotally connected to the connecting device 5 about a pivot axis near one end. The preferred embodiment of FIG. 1 according to the invention comprises a spoiler or "air deflector" 7 which is made in one piece with the rubber wiper blade 2 and which extends along the entire length thereof. No end caps are used, but free ends of the wiper blade 2 are cut at an oblique angle. In the alternative end caps are used.

Although not shown in FIG. 1, but fully understood by a skilled person, the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device 5 moves the wiper blade 2.

Figure 2:
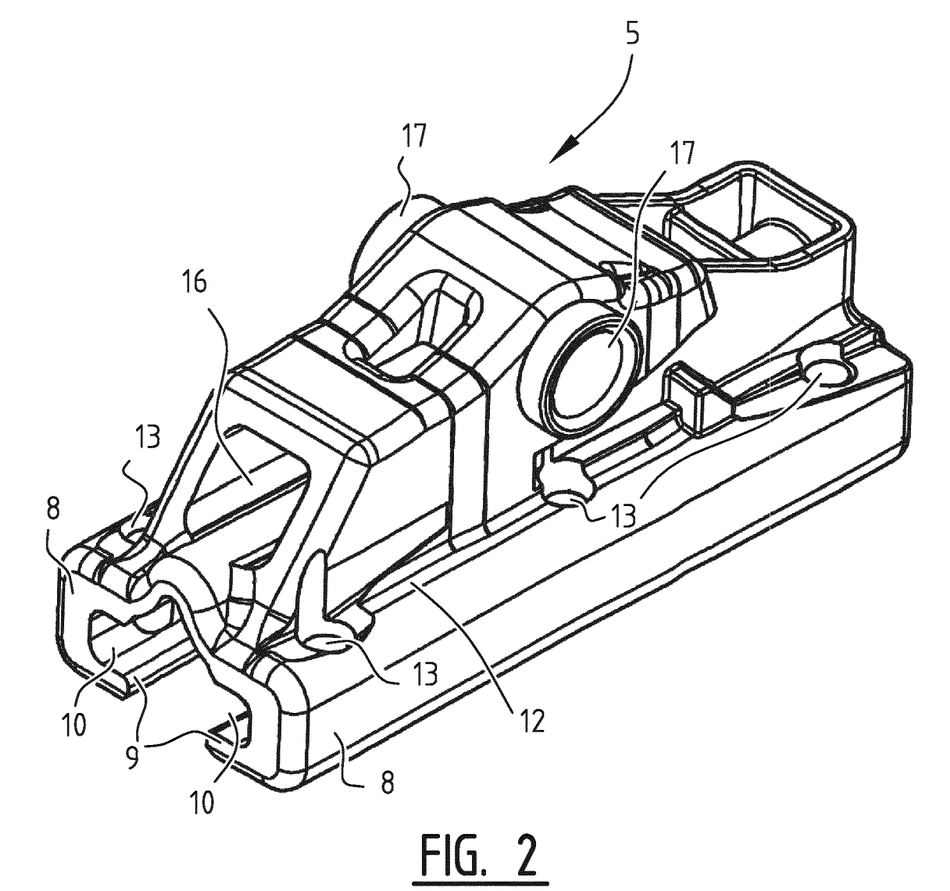
FIGS. 2 through 4 are several perspective, schematic views of a connecting device, as used in a windscreen wiper device of FIG. 1.
Figure 3:
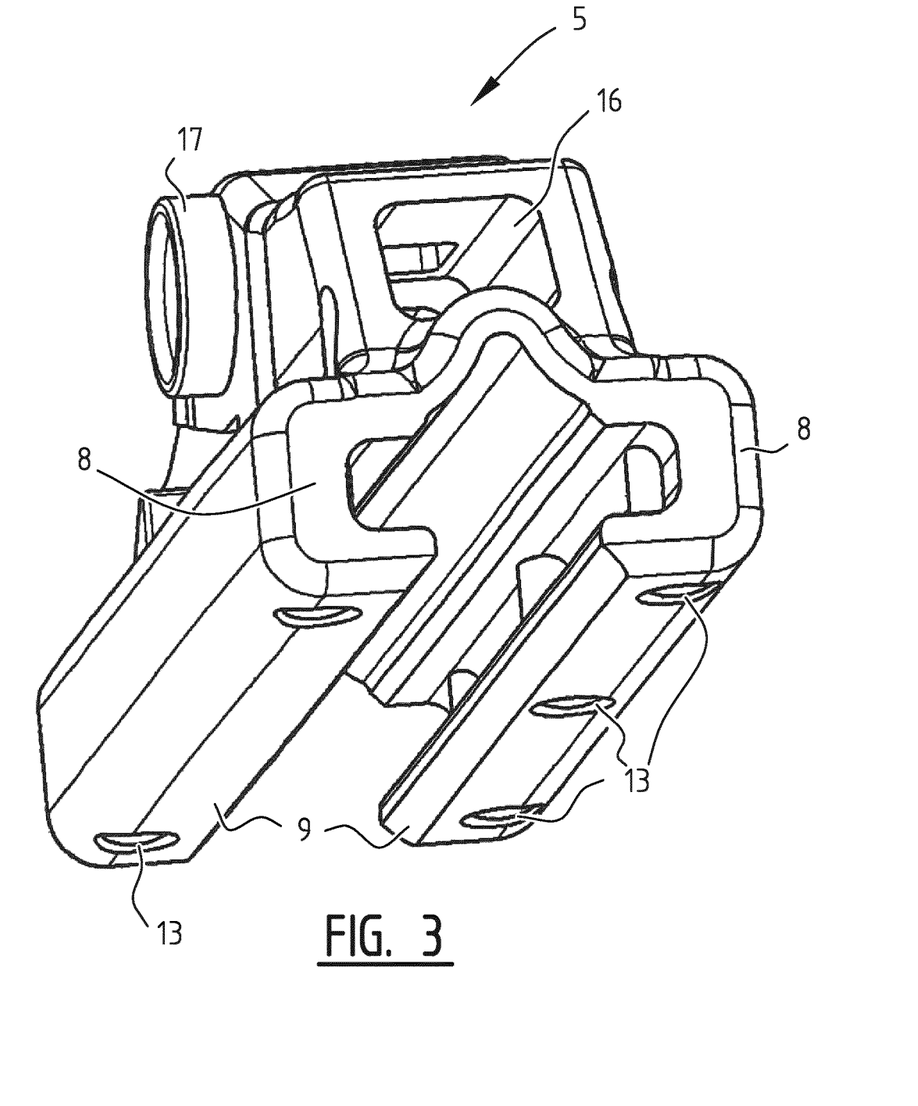
Figure 4:
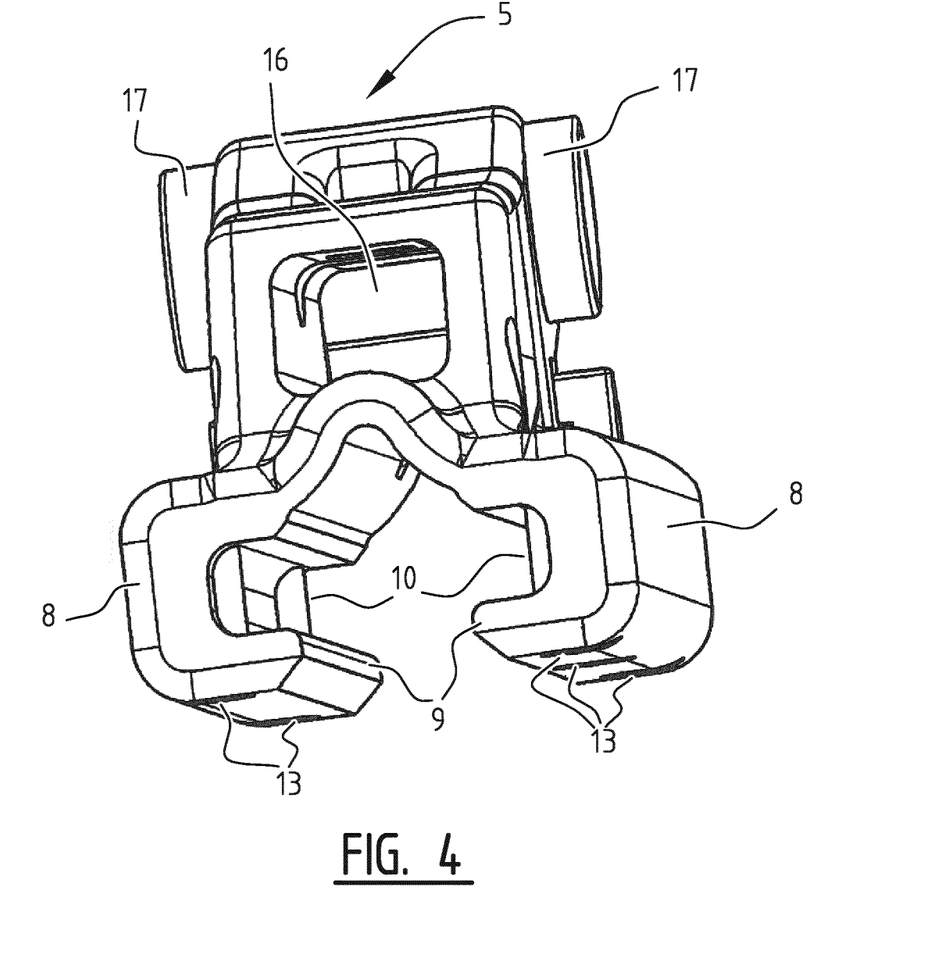

FIGS. 2 through 4 show in perspective several views of a connecting device 5 used in the windscreen wiper device 1 of FIG. 1. As mentioned earlier, this connecting device 5 has a more or less U-shaped cross-section with legs 8. Free ends 9 of the legs 8 of the U-shaped cross-section extend inwardly so as to form grooves or slits 10 for receiving longitudinal sides 11 of the wiper blade 2. the free ends 9 and parallel walls 12 of the connecting device 5 are provided with holes 13 for receiving one pin 14 of the first type and two pairs of opposite pins 15 of the second type, as will be further explained hereunder. the connecting device 5 may further comprise an interior space 16 functioning as a water channel extending in longitudinal direction of the connecting device 5. During use the water channel 16 transports rain water therethrough. In other words, in use rain water is carried away from a first side of the connecting device 5 facing away from the free end of the oscillating arm to a second side of the connecting device 5 facing towards the free end of the oscillating arm. As a result of the oscillatory movement of the oscillating arm, in practice an over pressure relative to the environment exists at the location of the first side of the connecting device 5, while an under pressure relative to the environment is present at the location of the second side of the connecting device 5. Due to the over pressure and the under pressure rain water is "automatically" pressed through the water channel.

With reference to FIGS. 1 through 4 the joint part 6 is detachably connected to the connecting device 5 by engaging protrusions 17 of the connecting device 5, at the location of the pivot axis, in co-axial recesses 18 provided in the joint part 6. As shown, the protrusions 17 extend outwards on either side of the connecting device 5. The joint part 6 comprises a resilient tongue 19 extending outwardly, while the oscillating arm has a U-shaped cross-section at the location of its connection to the joint part 6, so that the tongue 19 engages in an identically shaped hole provided in a base of the U-shaped cross-section. The connecting device 5 with the wiper blade 2 is mounted onto the oscillating arm as follows. The joint part 6 being already clipped onto the connecting device 5 is pivoted relative to the connecting device 5, so that the joint part 6 can be easily slided on a free end of the oscillating arm. During this sliding movement the resilient tongue 19 is initially pushed in against a spring force and then allowed to spring back into the hole in the oscillating arm, thus snapping, that is clipping the resilient tongue 19 into the hole of the oscillating arm. This is a so-called bayonet-connection. The oscillating arm together with the joint part 6 may then be pivoted back in a position parallel to the wiper blade 2 in order to be ready for use. By subsequently pushing in again the resilient tongue 19 against the spring force (as if it were a push button), the connecting device 5 and the joint part 6 together with the wiper blade 2 may be released from the oscillating arm. Dismounting the connecting device 5 with the wiper blade 2 from the oscillating arm is thus realized by sliding the connecting device 5 and the joint part 6 together with the wiper blade 2 in a direction away from the oscillating arm.

Figure 5:
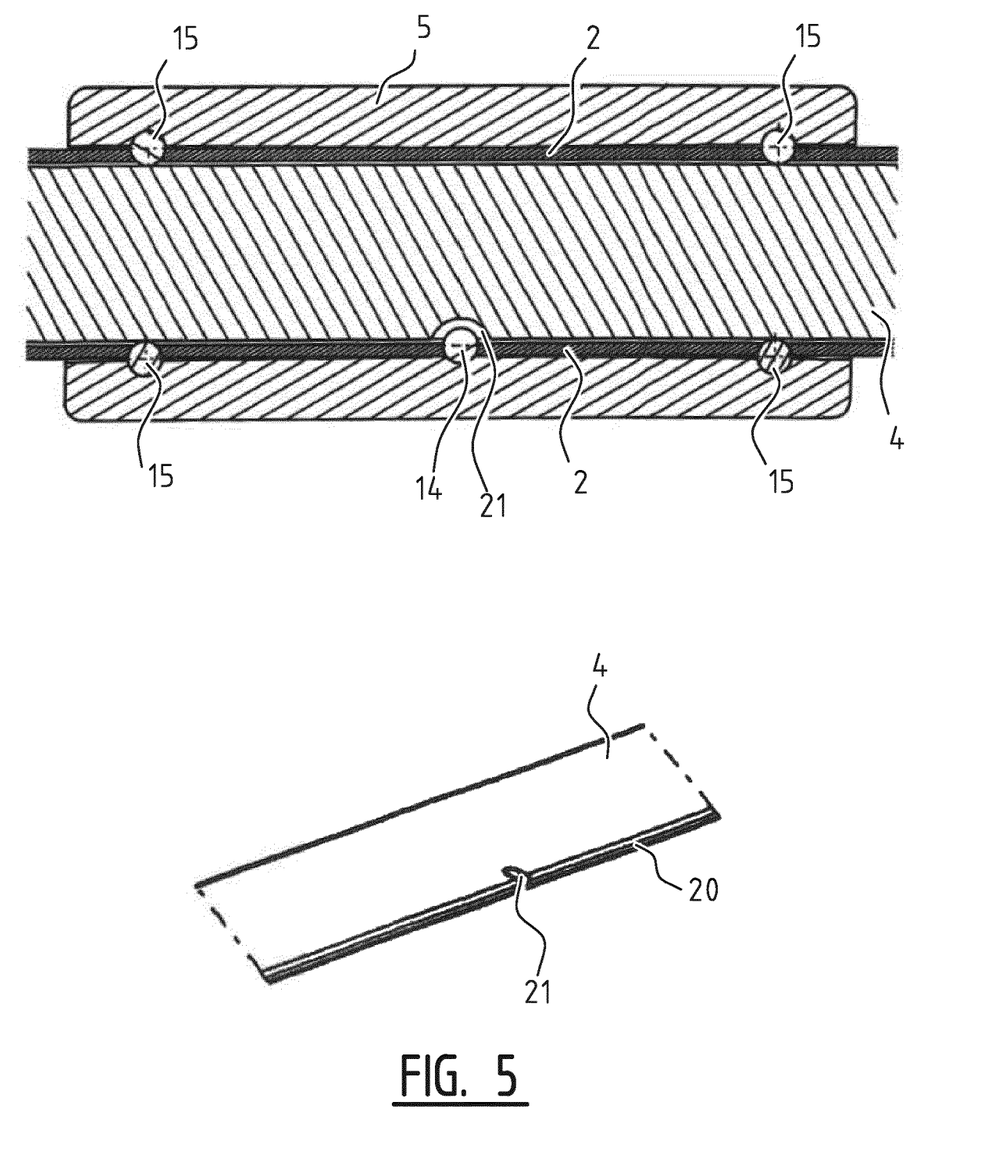
FIG. 5 shows in detail a schematic view from below of the connecting device of FIG. 2, further elucidating the working principle of the mutual fixation of the wiper blade and the longitudinal strip at the location of the connecting device of FIG. 2 according the invention.

The longitudinal strip 4, as shown in FIG. 5, is provided along an exterior edge 20 thereof with a recess 21 cooperating with the corresponding pin 14 of the first type. the recess 21 is made through a stamping operation in order to accurately control the shape of the recess 21. In mounted position the wiper blade 2 is allowed to move in longitudinal direction relative to the longitudinal strip 4 outside the location of the interconnection of the connecting device 6 and the wiper blade 2, whereas the pin 14 of the first type ensures that any such longitudinal movement of the wiper blade 2 inside the connecting device 5 is blocked. The pin 14 of the first type locally cuts the rubber. The retention of the wiper blade 2 is realized by introduction of the pins 14, 15 and thus cutting the rubber.

Referring to FIG. 5, in assembled position, the four pins 15 of the second type cut the rubber material of the wiper blade 2, so that these pins 15 come into contact with edges of the longitudinal strip 4. Thus, any lateral movement between the longitudinal strip 4 and the connecting device 5 at the location of their interconnection is blocked. In use, during each oscillatory movement of the oscillatory arm, the wiper blade 2 at the location outside the connection device 5 would normally suffer from the so-called "fishtailing phenomenon", wherein the wiper blade 2 on opposite sides of the connecting device 5 vibrates in an uncontrollable manner parallel to a windscreen to be wiped. Obviously, this "fishtailing phenomenon" results in deteriorated wiping properties, with all negative consequences involved, particularly at high speeds. Hence, the longitudinal strip 4 is allowed to exhibit a curvature at the location of the interconnection of the connecting device 5 and the wiper blade 2. Experimental results have shown that the "fishtailing phenomenon" is now avoided according to the invention at least to a large extend.

Figure 6:
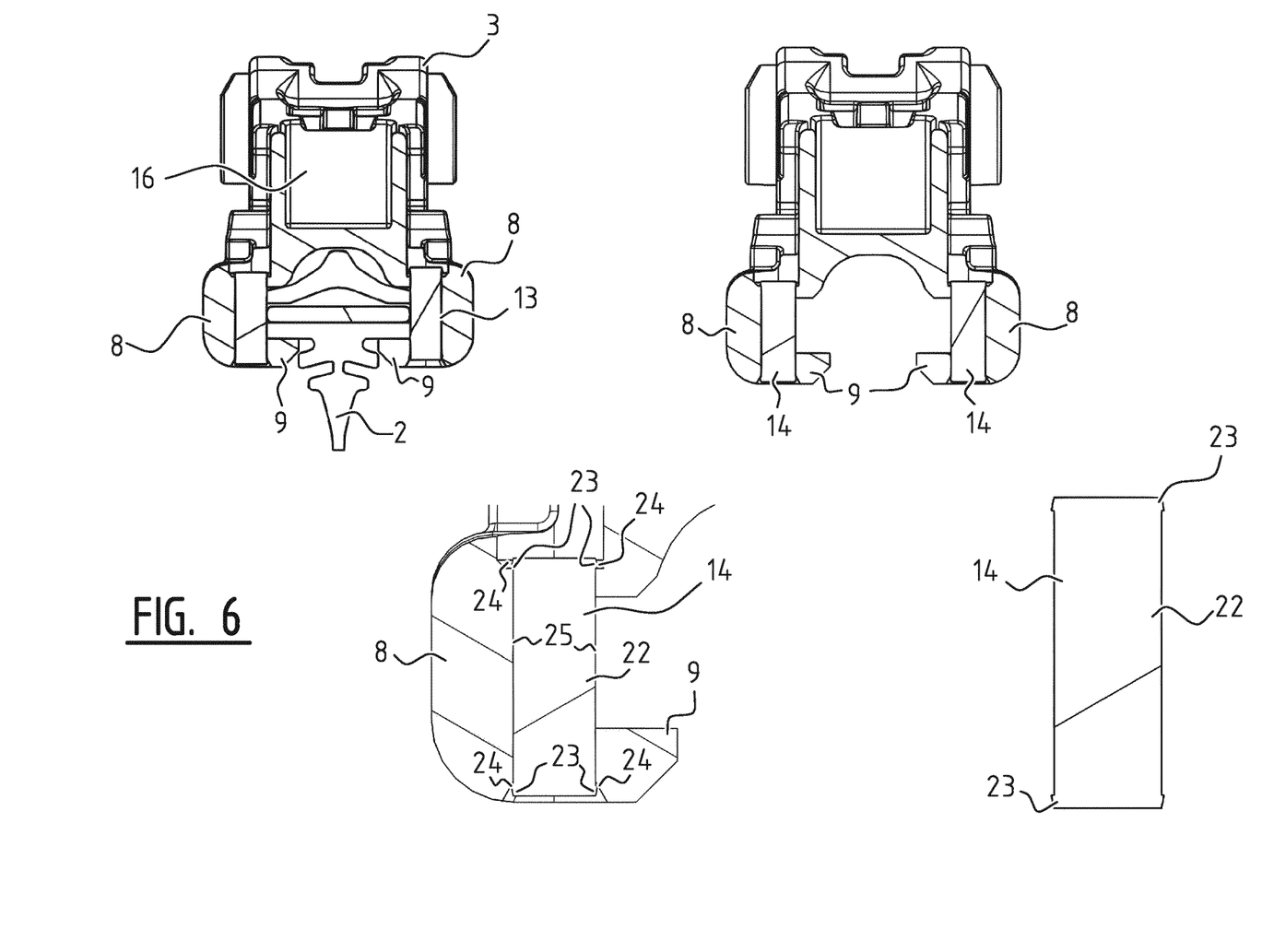
FIG. 6 refers to a first embodiment of the invention and is a cross-sectional view of the windscreen wiper device of FIG. 1 along the line A-A in FIG. 1 (with and without a wiper blade), as well as a side view of some details thereof.

Referring to FIG. 6, in a first embodiment of the invention each pin 14 of the first type comprises an elongate web 22 and two flanges 23 in one piece therewith and each located at an outer end of the web 22. When mounting a pin 14 of the first type inside a corresponding hole 13, the flanges 23 are snapped or clipped—through elastic or plastic deformation—behind edges 24 of an inner wall 25 of the hole 13 for form-locking the pin 14 inside the hole 13. The same applies when mounting a pin 15 of the second type inside a corresponding hole 13 provided in at least one leg 8 of the U-shaped cross-section of the connecting device 5.

Figure 7:
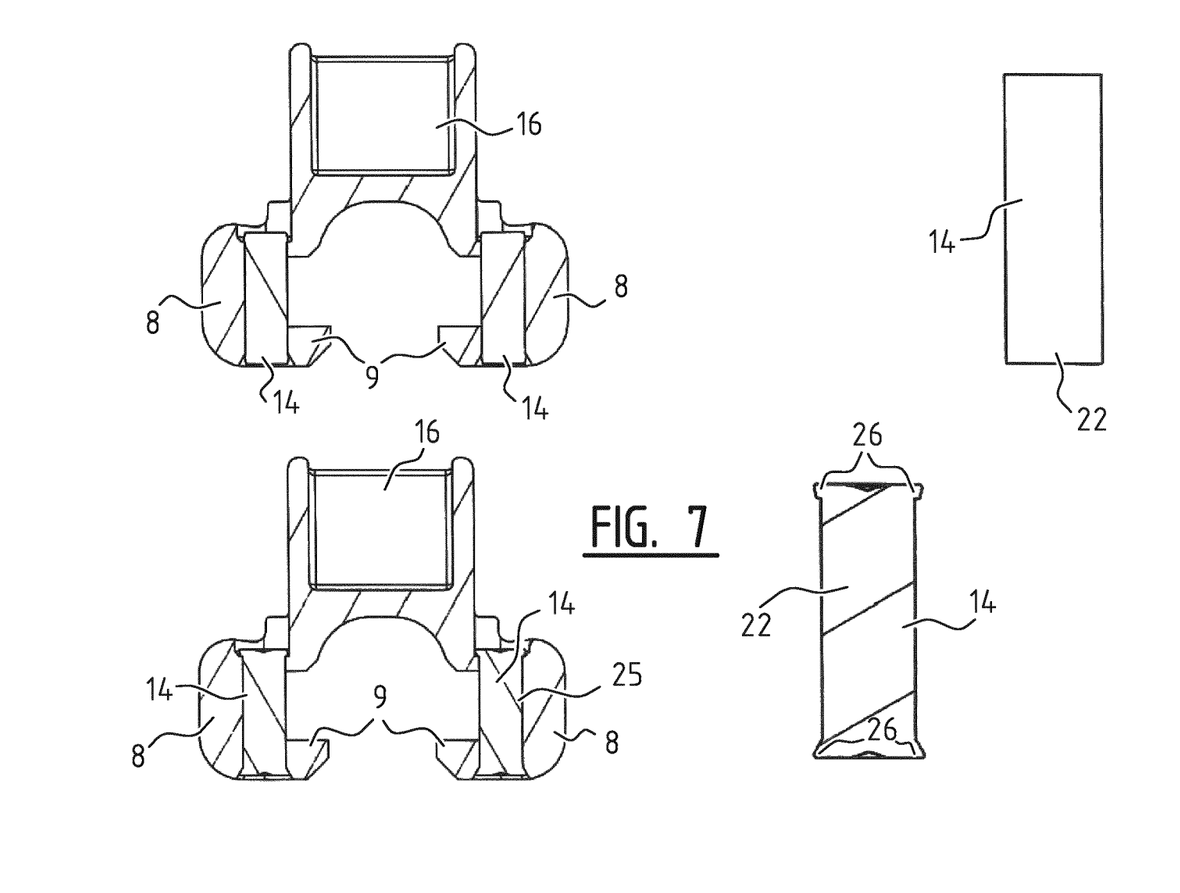
FIG. 7 refers to a second embodiment of the invention and is a cross-sectional view of the windscreen wiper device of FIG. 1 along the line A-A in FIG. 1 (without a wiper blade) before and after a riveting step, as well as a side view of some details thereof.

Referring to FIG. 7, in a second embodiment of the invention each pin 14 of the first type comprises just an elongate web 22 (see FIG. 7 above on the right). When mounting such a pin 14 of the first type inside a corresponding hole 13 (see FIG. 7 above on the left) the pin 14 is subsequently deformed by a special tool near its outer ends so as to form rivets 26 on both outer ends of the pin 14 (see FIG. 7 below on the left) for form-locking the pin 14 inside the hole 13 through a rivet connection. the rivets 26 form flanges resting against edges of the inner wall 25 of the hole 13. Such a deformed pin 14 of the first type is depicted in FIG. 7 below on the right. The same applies when mounting a pin 15 of the second type inside a corresponding hole 13 provided in at least one leg 8 of the U-shaped cross-section of the connecting device 5. In a third embodiment of the invention each pin 14,15 of the first and the second type is glued inside a hole 13 provided in the legs 8 of the U-shaped cross-section of the connecting device 5.

Figure 8:
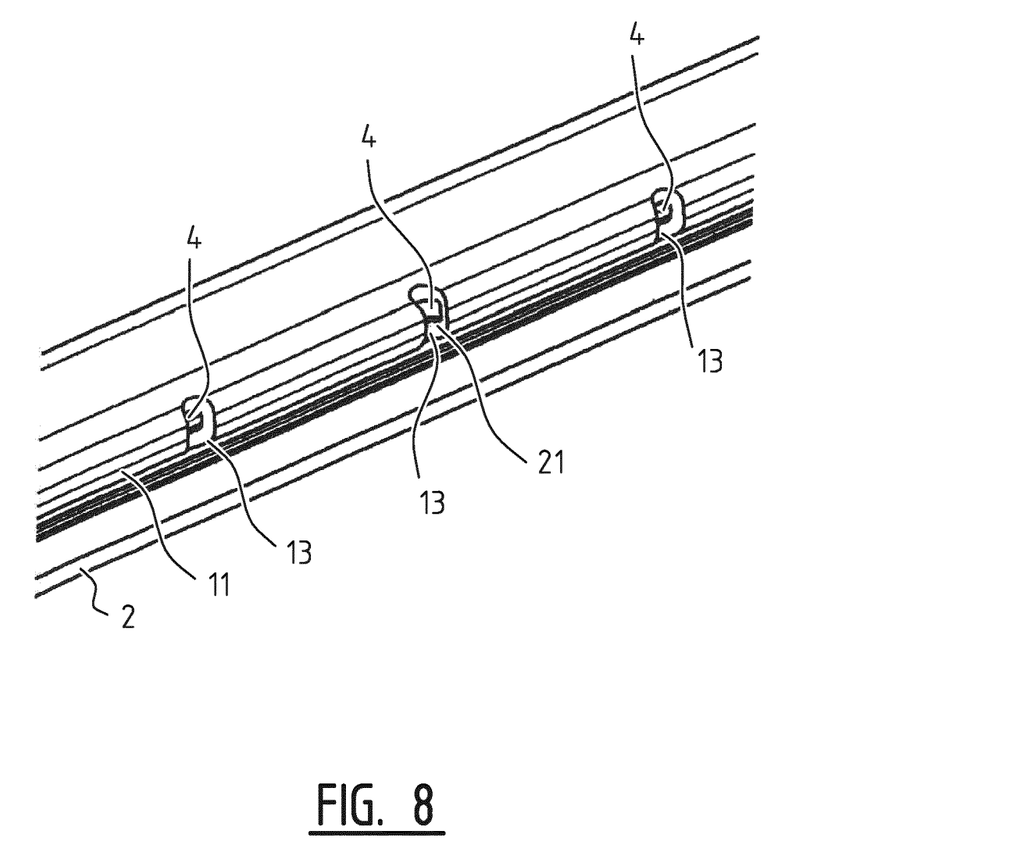
FIG. 8 shows in detail a schematic side view of a dissembled wiper blade, as used in FIG. 1.

FIG. 8 shows a perspective side view of a longitudinal side 11 of the wiper blade 2, without the pins 14,15 of the first type and of the second type, but with holes 13 showing the longitudinal strip 4 and its recess 21 for the one pin (14) of the first type. The cuts in the longitudinal strip are created during assembly when pins are introduced in the connecting device through the wiper blade.

Figure 9:
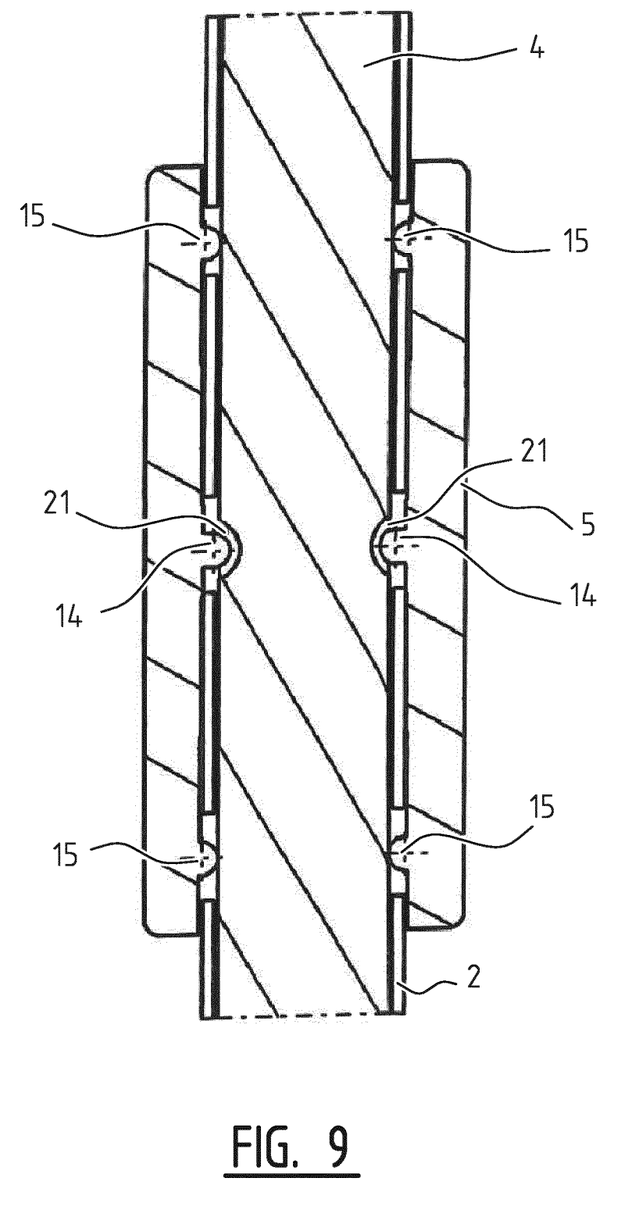
FIGS. 9 through 11 correspond to FIG. 5, but relate to other embodiments of the mutual fixation of the wiper blade and the longitudinal strip at the location of the connecting device.
Figure 10:
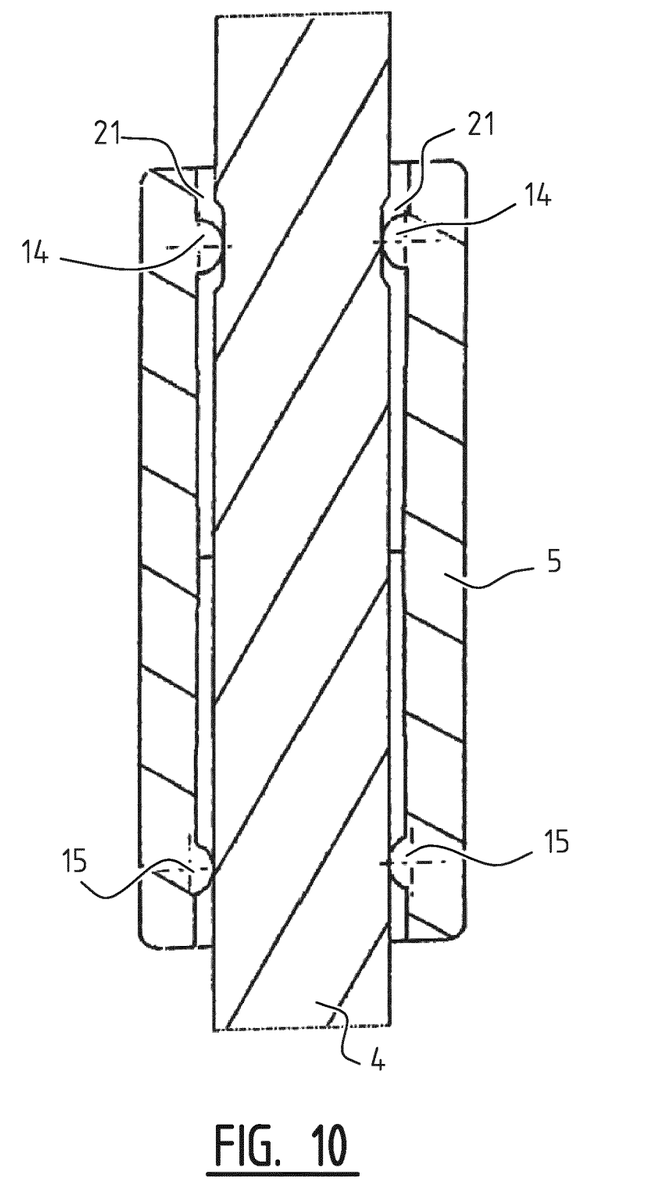
Figure 11:
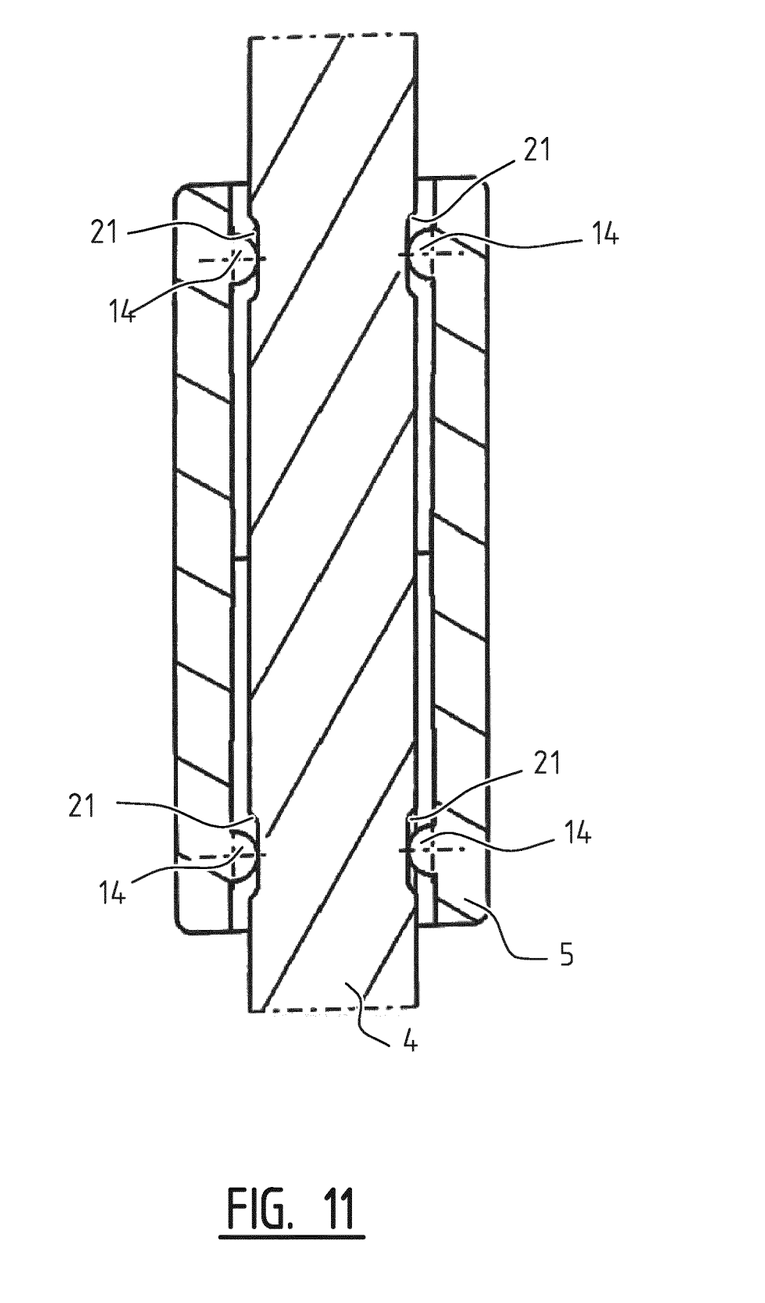

FIGS. 9, 10 and 11 show alternative embodiments compared to the one shown in FIG. 5, wherein the FIGS. 5, 9, 10 and 11 correspond to claims 9, 10, 11 and 12 respectively. A skilled person would, for example, easy understand that the pins of the first type and of the second type could have a round cross-section (elliptical or circular), a rectangular cross-section, or a square cross-section.

The invention is not restricted to the variants shown in the drawing, but it also extends to other preferred embodiments that fall within the scope of the appended claims.

The invention claimed is:

1. A windscreen wiper device of the flat blade type, comprising an elastic, elongated carrier element, as well as an elongated wiper blade of a flexible material, which can be placed in abutment with a windscreen to be wiped, wherein said wiper blade includes at least one longitudinal groove, wherein at least one longitudinal strip of the carrier element is disposed within said groove, wherein said windscreen wiper device comprises a connecting device for attachment to an oscillating arm, wherein said connecting device is connected to the flexible material of said wiper-blade by at least one pin, wherein said pin cooperates with a first recess provided along an exterior edge of said longitudinal strip in order to limit any movement of said wiper blade in longitudinal direction thereof relative to said longitudinal strip at the location of the interconnection of said connecting device and said wiper blade, wherein said connecting device has a U-shaped cross-section, wherein free ends of legs of said U-shaped cross-section extend inwardly so as to foam grooves for receiving longitudinal sides of said wiper blade, and wherein at least one of said legs is provided with a hole for receiving said pin, wherein said hole is surrounded by an inner wall of said leg, wherein said pin comprises an elongated web extending longitudinally between opposite outer ends and a flange projecting radially near each outer end of said web, and wherein each surface surrounding respective hole ends of said hole comprises a second recess, and an edge is defined between the respective second recesses and respective ends of the inner wall, wherein each flange is snapped in a respective one of said second recesses, for form-locking said pin inside said hole.

2. A windscreen wiper device according to claim 1, wherein said web and said flange are made in one piece.

3. A windscreen wiper device according to claim 1, wherein said pin is deformed near its outer ends so as to form said flanges for form-locking said pin inside said hole.

4. A windscreen wiper device according to claim 1, wherein said connecting device is connected to the flexible material of said wiper blade by said at least one pin being of a first type and at least one pin of a second type, wherein said pin of the second type is cutting said wiper blade at the location of said connecting device in order to block any lateral movement of longitudinal strip at the location of the interconnection of said connecting device and said wiper blade.

5. A windscreen wiper device according to claim 4, wherein said pin of the first type and said pin of the second type are separate constructional elements extending at least perpendicular to the windscreen to be wiped.

6. A windscreen wiper device according to claim 4, wherein said connecting device is connected to the flexible material of said wiper blade by one pin of the first type interconnecting said connecting device and said wiper blade near the middle longitudinal plane of said connecting device perpendicular to the windscreen to be wiped and by two pairs of opposite pins of the second type interconnecting said connecting device and said wiper blade near the outer ends of said connecting device.

7. A windscreen wiper device according to claim 4, wherein said connecting device is connected to the flexible material of said wiper blade by one pair of opposite pins of the first type interconnecting said connecting device and said wiper blade near the middle longitudinal plane of said connecting device perpendicular to the windscreen to be wiped and by two pairs of opposite pins of the second type interconnecting said connecting device and said wiper blade near the outer ends of said connecting device.

8. A windscreen wiper device according to claim 4, wherein said connecting device is connected to the flexible material of said wiper blade by one pair of opposite pins of the first type and by one pair of opposite pins of the second type interconnecting said connecting device and said wiper blade near the outer ends of said connecting device.

9. A windscreen wiper device according to claim 4, wherein said connecting device is connected to the flexible material of said wiper blade by two pairs of opposite pins of the first type interconnecting said connecting device and said wiper blade near the outer ends of said connecting device.

10. A method for manufacturing a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for connection to an oscillating arm, wherein first a first recess is cut along an exterior edge of said longitudinal strip, wherein said connecting device is subsequently mounted onto said wiper blade, wherein said longitudinal strip is subsequently inserted inside said groove, wherein said connecting device has a U-shaped cross-section, wherein free ends of legs of said U-shaped cross-section extend inwardly so as to form said grooves for receiving longitudinal sides of said wiper blade, and wherein at least one of said legs is provided with a hole for receiving a pin, wherein said hole is surrounded by an inner wall of said leg, said pin comprising an elongated web extending longitudinally between opposite outer ends and a flange projecting radially near each outer end of said web, said pin is subsequently inserted inside said hole, whereinafter at least one pin is used, said pin cooperating with said first recess provided along said exterior edge of said longitudinal strip in order to limit any movement of said wiper blade in a longitudinal direction thereof relative to said longitudinal strip at the location of the interconnection of said connecting device and said wiper blade, and wherein each surface surrounding respective hole ends of said hole comprises a second recess, and an edge is defined between the respective second recesses and respective ends of the inner wall, and thereafter each flange of said pin subsequently snapping in a respective one of said second recesses, thereby form-locking said pin inside said hole.

* * * * *